(12) United States Patent
Jamkhedkar et al.

(10) Patent No.: US 11,470,166 B2
(45) Date of Patent: Oct. 11, 2022

(54) MULTI-TENANT MARKETPLACE ARCHITECTURES

(71) Applicant: PayPal, Inc., San Jose, CA (US)

(72) Inventors: Prashant Jamkhedkar, Freemont, CA (US); Aravindan Ranganathan, San Jose, CA (US); Sandeep Kumar, Fremont, CA (US); Norihiro Aoki, San Jose, CA (US); Justin White, La Selva, CA (US); Jeffrey David Meyer, Los Gatos, CA (US); Raghavendra Nagappa, Cupertino, CA (US)

(73) Assignee: PAYPAL, INC., San Jose, CA (US)

( * ) Notice: Subject to any disclaimer, the term of this patent is extended or adjusted under 35 U.S.C. 154(b) by 957 days.

(21) Appl. No.: 16/236,333

(22) Filed: Dec. 28, 2018

(65) Prior Publication Data

US 2019/0387072 A1 Dec. 19, 2019

Related U.S. Application Data

(63) Continuation-in-part of application No. 16/009,994, filed on Jun. 15, 2018, now Pat. No. 11,030,329.

(51) Int. Cl.
*H04L 67/306* (2022.01)
*H04L 67/1087* (2022.01)
(Continued)

(52) U.S. Cl.
CPC ......... *H04L 67/306* (2013.01); *G06Q 10/067* (2013.01); *G06Q 20/326* (2020.05); *H04L 67/1046* (2013.01); *H04L 67/1089* (2013.01)

(58) Field of Classification Search
CPC .............. H04L 67/306; H04L 67/1046; H04L 67/1089; G06Q 10/067; G06Q 20/326
See application file for complete search history.

(56) References Cited

U.S. PATENT DOCUMENTS 7,657,639 B2  2/2010 Hinton
8,271,536 B2  9/2012 Amradkar et al.
(Continued)

OTHER PUBLICATIONS

ANONYMOUS "Multitenancy—Wikipedia," Mar. 5, 2014, Retrieved from the Internet: <https://en.wikipedia.org/w/index.php?title=Multitenancy&oldid=598245774>.
(Continued)

*Primary Examiner* — Nicholas P Celani
(74) *Attorney, Agent, or Firm* — Haynes and Boone, LLP (57) ABSTRACT

A method for managing entities in a multi-tenant marketplace architecture system is discussed. The method includes determining that a merchant is represented as a first representation in a first hierarchical data structure and as a second representation in a second hierarchical data structure, where both the first and second hierarchical data structures are managed by a first service provider. The merchant is being managed via a full representation in an original hierarchical data structure by a marketplace service provider. The first and second representations provide outbound services via the first hierarchical data structure and via the second hierarchical data structure, respectively. The method also includes linking the first representation with the second representation to configure the first and second representations for propagating results of an inbound service applied to one of the first and second representations to a remaining one of the first and second representations.

20 Claims, 6 Drawing Sheets

(51) Int. Cl.
  *G06Q 10/06* (2012.01)
  *H04L 67/104* (2022.01)
  *G06Q 20/32* (2012.01)

(56) References Cited

U.S. PATENT DOCUMENTS

| | | | |
|---|---|---|---|
| 8,819,801 | B2 | 8/2014 | Sangubhatla |
| 8,918,641 | B2 | 12/2014 | Smith et al. |
| 9,058,481 | B2 | 6/2015 | Prasad et al. |
| 9,218,599 | B1 | 12/2015 | Hilbring |
| 9,710,664 | B2 | 7/2017 | Sathyadevan et al. |
| 9,781,122 | B1 | 10/2017 | Wilson et al. |
| 10,931,656 | B2 | 2/2021 | Carru et al. |
| 2002/0010591 | A1 | 1/2002 | Pomerance |
| 2004/0117298 | A1 | 6/2004 | Algiene et al. |
| 2006/0059565 | A1 | 3/2006 | Green et al. |
| 2007/0150480 | A1 | 6/2007 | Hwang et al. |
| 2008/0154783 | A1 | 6/2008 | Rule et al. |
| 2009/0125972 | A1* | 5/2009 | Hinton .............. G06F 21/41 726/1 |
| 2011/0276892 | A1 | 11/2011 | Jensen-Horne et al. |
| 2012/0072307 | A1 | 3/2012 | Kassaei et al. |
| 2012/0197963 | A1 | 8/2012 | Bouw et al. |
| 2013/0046600 | A1 | 2/2013 | Coppinger |
| 2013/0318241 | A1 | 11/2013 | Acharya et al. |
| 2014/0230076 | A1 | 8/2014 | Micucci et al. |
| 2015/0161620 | A1 | 6/2015 | Christner |
| 2015/0193775 | A1 | 7/2015 | Douglas et al. |
| 2015/0193858 | A1 | 7/2015 | Reed et al. |
| 2016/0087960 | A1 | 3/2016 | Pleau et al. |
| 2016/0292694 | A1* | 10/2016 | Goldschlag .......... H04L 63/20 |
| 2016/0335118 | A1* | 11/2016 | Beiter .............. G06F 9/468 |
| 2016/0337365 | A1 | 11/2016 | Beiter |
| 2017/0012962 | A1 | 1/2017 | Lissack et al. |
| 2017/0048306 | A1 | 2/2017 | Amador |
| 2017/0318128 | A1 | 11/2017 | Ananthanarayanan et al. |
| 2017/0323117 | A1* | 11/2017 | Pleau .............. H04L 63/104 |
| 2018/0013763 | A1 | 1/2018 | Wilson et al. |
| 2018/0075231 | A1 | 3/2018 | Subramanian et al. |
| 2018/0081905 | A1 | 3/2018 | Kamath et al. |
| 2019/0014120 | A1 | 1/2019 | Drabant |
| 2019/0026486 | A1 | 1/2019 | Pleau et al. |
| 2020/0007529 | A1 | 1/2020 | Bahrenburg et al. |
| 2020/0412538 | A1 | 12/2020 | Rosado |

OTHER PUBLICATIONS

Ashwini A., "What Are the Pros and Cons of Multi-tenancy in Rails Application?", Retrieved from the Internet: https://medium.com/swlh/what-are-the-pros-and-cons-of-multi-tenancy-in-rails-application-547d0f9c205f, Oct. 3, 2017, 9 pages.
Axero, "Single Tenant vs Multi Tenant Business Software", COMMUNIFIRE, Retrieved on Apr. 30, 2018, Retrieved from the Internet URL: https://axerosolutions.com/blog/single-tenant-vs-multi-tenant-business-software, 9 pages.
Crown N., "An Introduction to SCIM: System for Cross-Domain System for Cross-Domain Identity Management", RSAConference, Europe, 2012, Retrieved on Apr. 24, 2018, Retrieved from the Internet URL: https://docs.huihoo.com/rsaconference/europe-2012/How-SCIM-Simplifies-Migration-to-Cloud-Services.pdf, 24 pages.
Ed K.L., et al., "System for Cross-Domain Identity Management: Definitions, Overview, Concepts and Requirements" Retrieved on Apr. 24, 2019, Retrieved from the Internet URL: https://www.rfc-editor.org/rfc/pdfrfc/rfc7642.txt.pdf, 19 pages.
European Application No. 19819808.7, Extended European Search Report dated Jun. 8, 2021, 7 pages.
International Appl. No. PCT/US2019/037242, International Preliminary Report on Patentability dated Dec. 24, 2020, 12 pages.
International Appl. No. PCT/US2019/037242, International Search Report and Written Opinion dated Oct. 4, 2019, 12 pages.
International Appl. No. PCT/US2019/064325, International Search Report and Written Opinion dated Mar. 24, 2020, 16 pages.
International Application No. PCT/US2019/064325, International Preliminary Report on Patentability dated Jun. 17, 2021, 6 pages.
International Application No. PCT/US2019/068993, International Preliminary Report on Patentability dated Jul. 8, 2021, 8 pages.
International Application No. PCT/US2019/068999, International Preliminary Report on Patentability dated Jul. 8, 2021, 7 pages.
International Application No. PCT/US2019/068999, International Search Report and Written Opinion dated Mar. 31, 2020, 8 pages.
International Search Report and Written Opinion for International Application No. PCT/US2019/68993 dated Mar. 31, 2020, 14 pages.
International Search Report and Written Opinion for International Application No. PCT/US2019/68999 dated Mar. 31, 2020, 14 pages.
Jones M., et al., "JSON Web Token (JWT)," Internet Engineering Task Force (IETF), May 2015, 30 pages.
Kabbedijk J., et al., "Multi-Tenant Architecture Comparison", Retrieved on Apr. 30, 2018, Retrieved from the Internel URL: https://pdfs.semanticscholar.org/17fb/e778244aa190da9d56c5fb8c2e64c63cd621.pdf, 8 pages.
Microsoft., "Chapter 2: Key Principles of Software Architecture," Retrieved on Apr. 30, 2018, 6 pages.
Mundra M., "Multi-Tenant Vs. Single-Tenant Architecture (SaaS)," Retrieved from the Internet URL: https://blogs.sap.com/2015/07/12/multi-tenant-vs-single-tenant-architecture-saas/, Jul. 12, 2015, 5 pages.
SAGEINTACCT., "Multi-Tenancy is Fundamental to SaaS Applications—and It's Better for You, Too" Retrieved on Dec. 7, 2018, Retrieved from the Internet URL: https://www.sageintacct.com/cloud-erp/multi-tenant-cloud-architecture, 4 pages.
Solanki N., et al., "Multi-Tenant Access and Information Flow Control for SaaS", IEEE International Conference on Web Services, Jun. 27, 2016, Retrieved from the Internet URL: https://ieeexplore.ieee.org/document/7557990, Retrieved on Mar. 3, 2021, 8 pages.

* cited by examiner

MULTI-TENANT MARKETPLACE ARCHITECTURES

This application claims the benefit of and is a continuation-in-part of U.S. application Ser. No. 16/009,994, titled "Unified Identity Services for Multi-Tenant Architectures," filed on Jun. 15, 2018, the disclosure of which is incorporated herein by reference in its entirety.

BACKGROUND

Embodiments of the present disclosure generally relate to the field of software architecture and, more particularly, to managing how various entities are on-boarded, managed, and/or accessed in a multi-tenant system architecture.

Complex software systems can have various architectures, including a single-tenant software architecture and a multi-tenant software architecture, among others. In a single-tenant software architecture, each entity (such as a company or a portion of that company) can have their own instances of each software application, data, and any supporting infrastructure. In a single-tenant architecture, the software for each tenant entity can be customized as desired. However, drawbacks of using the single tenant architecture include expense in resources, as well as requirements to host, customize, and maintain separate software applications for each tenant.

In contrast, in a multi-tenant software architecture, each entity can share the same instances of applications, data, and/or infrastructure. A multi-tenant software provider can provision their applications and/or resources to multiple entities from a single software architecture. In multi-tenant software architecture, access to data can be shared among the various entities. By sharing much of the applications, data, and software, various resources such as installation, configuration, number of physical servers, maintenance, and even power can be optimized. However, drawbacks of using multi-tenant architecture include complexity of managing how multiple software applications are configured and shared among multiple clients. Also, design of multi-tenant architecture-based software systems that provides secure and reliable access to the data, resources, and/or transaction services that operate using the data and/or resources can be problematic. Furthermore, interoperability difficulties may arise when using software applications, in a multi-tenant architecture system, that were initially managed and/or hosted by different businesses.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and/or computer program products that embody techniques of the present disclosure. However, it is understood that the described embodiments may be practiced without these specific details. For instance, although some examples refer to accessing tenant services, other types of service providers are contemplated, such as of Software-as-a-Service (SaaS), among others.

In a multi-tenant software architecture described herein, each tenant can share the applications, data, and/or infrastructure. A multi-tenant software provider can use a multi-tenant software platform to provision applications and/or resources to multiple entities. The multi-tenant software platform can facilitate addition of new tenants and on-board data and/or services provided by these new tenants. The multi-tenant software platform can implement rules and policies for data access by various entities across the tenants. The multi-tenant software platform can use identity services to provide access to these services, such as from an entity associated one tenant to a service provided by another tenant. The multi-tenant software platform can facilitate transaction services between tenants, such as a transaction service originating at one tenant that accesses resources at another tenant.

The multi-tenant software platform (also referred to as a multi-tenant platform) can include multiple tenants that have been previously on-boarded. The multi-tenant platform can facilitate access, using a unified identity associated with a user, to the entities, policies, and services of these tenants. The tenants can be hosted and managed by service providers. Access to the services can be determined based on privileges of the unified identity, as well as on policies of each of the tenants. The services can include various merchant services, such as in-store check-out (at a certain tenant) via a user device (associated with the unified identity), access to an online store of the tenant, order-ahead at a certain store of the tenant, a cash-in process (e.g., at an Automated Teller Machine (ATM)) at a certain tenant, a cash-out process (e.g., at an ATM), self-checkout for fuel at pay-at-the-pump stations of the tenant, among others.

The services can include SaaS and Platform as a Service (PaaS) services and/or other cloud services that are accessible by the user device. For example, the solution provider can provide access, to the user device, to various software applications, or deliver such software to the user device. The services can also include inter-tenant transaction services, where a transaction service that is originated at a first tenant needs to access transaction resources at a second tenant. The multi-tenant platform can access other services, such as multi-tenant identity services, multi-tenant social graph service, and/or multi-tenant transaction resource service to determine how to process a certain inter-tenant transaction service.

The multi-tenant platform can thus utilize unified identity services to provide access to selected services and/or data of the tenants based on policies associated with each of the tenants. The multi-tenant platform can use separate databases to store data to achieve isolation, such as when new tenants are on-boarded onto the existing platform, and to provide logical and/or physical data isolation. Shared data access can be made possible by on-boarding the tenants and selectively cross-exposing services. For example, for a multi-tenant platform managed by PAYPAL, certain capabilities of the multi-tenant platform such as Risk-as-a-Service (RaaS) and/or CaaS (Compliance-as-a-Service) can be provided to third-party on-boarded tenants such as FACEBOOK, GOOGLE, and their respective organizations, such as marketplaces, shops, and others. Thus, in some embodiments, the multi-tenant platform can include a core tenant (such as PAYPAL) that offers core services and infrastructure (including Identity-as-a-Service (IaaS) functionality and CaaS) and any additional data access to selected tenants and/or users accessing the multi-tenant platform from that tenant. The level of access to the core services and/or infrastructure can be determined by rules and/or policies of each tenant and/or of the multi-tenant platform.

The multi-tenant platform can onboard new tenants by using a one or more data structures. In some embodiments, the multi-tenant platform can expose appropriate user experiences for a user application based on the user request. The multi-tenant platform can implement methods for providing IaaS services to various entities and/or tenants. The multi-tenant platform can provide the IaaS and other services by accessing services and entities that are modeled via various hierarchical data structures (or modeled by using other implementations). As discussed below, the multi-tenant platform can onboard third-party tenants and provide inbound and outbound services for these tenants and their respective organizations. Some results of certain inbound services can be propagated and shared between similar representations of the same merchant.

In some embodiments, the multi-tenant platform can determine that a merchant is represented as a first representation in a first hierarchical data structure and as a second representation in a second hierarchical data structure, where both the first and second hierarchical data structures are managed by a first service provider. The merchant can be managed via a full representation in an original hierarchical data structure by a marketplace service provider. The first and second representations provide outbound services via the first hierarchical data structure and via the second hierarchical data structure, respectively. The multi-tenant platform can link the first representation with the second representation to configure the first and second representations for propagating results of an inbound service applied to one of the first and second representations to a remaining one of the first and second representations. The following description and associated Figures illustrate various embodiments directed to the ideas listed above.

Figure 1:
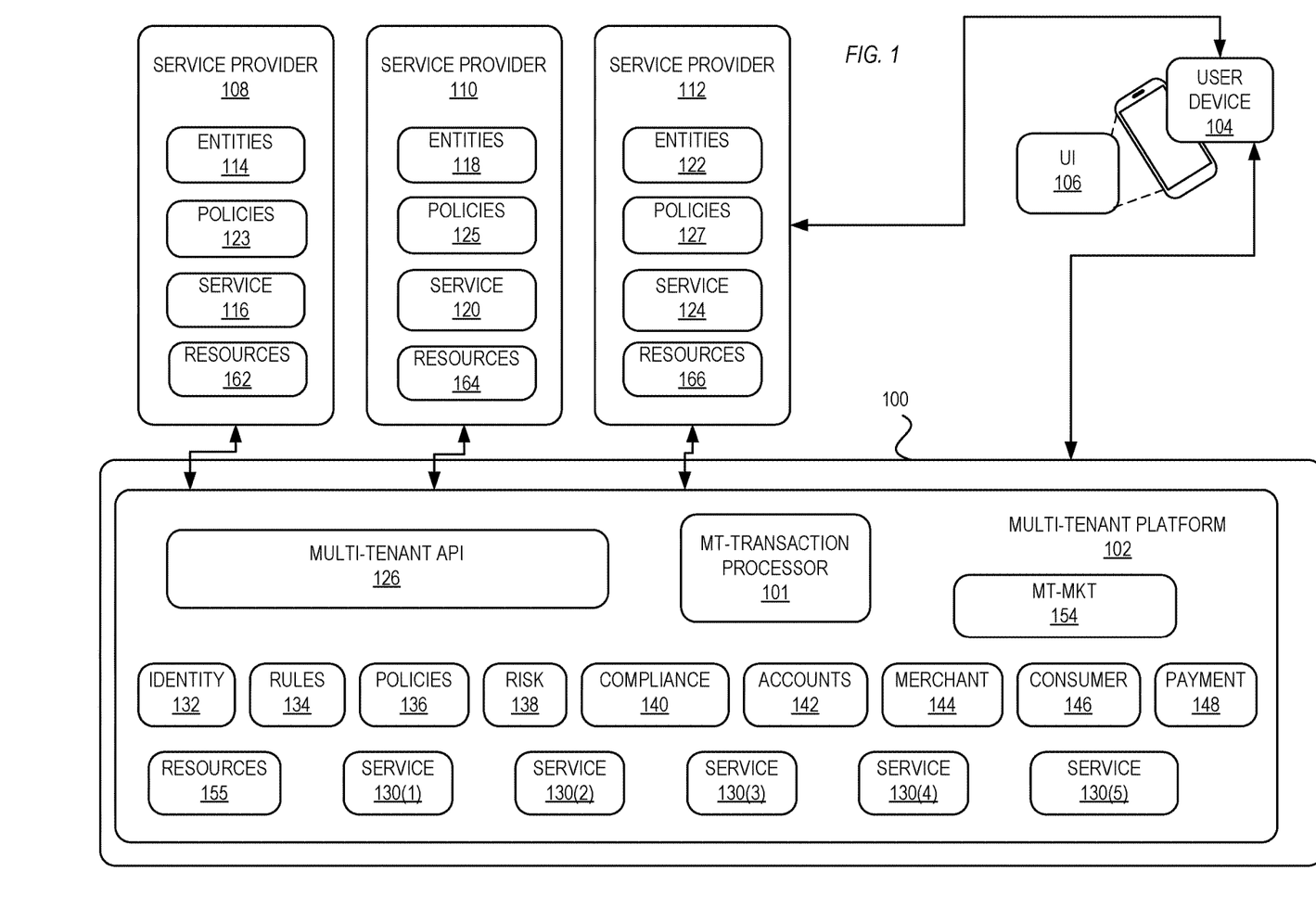
FIG. 1 is a system diagram illustrating embodiments of a multi-tenant software architecture system that can be accessed by communicating with a user device.

FIG. 1 is a system diagram illustrating embodiments of a multi-tenant software architecture system that can be accessed by communicating with a user device. In an overview of the system diagram, a user device 104 can communicate with a processing system 100 that includes a multi-tenant platform 102. The processing system 100 can process requests using a multi-tenant transaction processor (mt-transaction processor) 101. The multi-tenant platform 102 can provide access to multiple service providers 108, 110, and 112. In some embodiments, the multi-tenant platform 102 can model each of the service providers 108-112 such that the mt-transaction processor 101 can access services 116-124, policies 123-127, and/or resources 162-166 of the service providers.

The multi-tenant platform 102 includes core services at elements 132-148, as well as additional services 130(1)-130(5). The multi-tenant platform 102 can provide services to the service providers 108-112, such as IaaS services that may be required for accessing other services, including CaaS. Thus, the multi-tenant platform 102 can manage a plurality of tenants, each one of which can be associated with one or more services, which are then exposed for access. In some embodiments, each of the service providers 108-112 can be the actual providers that are then represented (e.g., by modeling) in the multi-tenant software architecture (i.e., in the multi-tenant platform 102). Although not shown in FIG. 1, each of the service providers 108-112 can include a respective transaction processor for processing own requests. The mt-transaction processor 101 can be a transaction processor that was fully integrated onto the multi-tenant platform 102. The mt-transaction processor 101 can be a default transaction processor for processing transactions.

The multi-tenant platform 102 can store user information for users at the accounts 142. In some embodiments, the accounts 142 includes information for users (also referred to as "core users") of a core tenant. The core tenant can be one of the service providers 108-112, or a service provider that is fully integrated into the multi-tenant platform 102. The multi-tenant platform 102 can facilitate provision of various core services to the core users. The core services can include identity services 132, risk services 138, compliance services 140, and payment services 148, which includes payout services. In one embodiment, the multi-tenant platform 102 provides IaaS services at the identity services 132 element. The identity services 132 can generate and maintain a core hierarchical data structure for managing its core entities. The core services can also include access to policy configuration 136, as well as access to accounts 142, merchants 144, and consumers 146. The accounts 142 are associated with the identity services 132. The multi-tenant platform 102 can also provide inter-tenant transaction services, such as between tenants 108 and 110, where the tenants 108 and 110 need not be fully integrated.

The service provider 108 can include entities 114, policies 123, services 116, and transaction resources 162. Similarly, the service providers 110 and 112 include entities 118 and 122, policies 125 and 127, services 120 and 124, and/or transaction resources 164 and 166, respectively. The elements 114, 123, 116, and 162 of the service provider 108, and similar elements of the service providers 110 and 112 can be modeled by the multi-tenant platform 102, as discussed below. In some embodiments, the MT-MKT 154 can model and manage the relationships between merchants/sellers of the service providers, while the identity services 132 model and maintain identity of various entities across the multi-tenant platform 102. In some embodiments, a certain service provider can be fully integrated onto the multi-tenant platform 102, a process which can include generating the core hierarchical data structure for the core tenant. In this example, the identity services 132 can manage the core users (e.g., in its own namespace), meaning that the service provider 108 does not have its own identity service for its own users.

The service providers 108, 110, and 112 can be on-boarded onto the multi-tenant platform 102 and manage their own identities. Any access from the service provider 110 for access of a service other than its own services 120, such as access of a service 130(1), uses a unified identity for access of services and/or data across the multi-tenant platform 102. During the onboarding process, the multi-tenant platform 102 can generate models of the respective service provider(s) by the identity services 132 and the MT-MKT 154. In some embodiments, the MT-MKT 154 is logically modeled as a part of the identity services 132 (e.g., as a subset of its hierarchical data). In some embodiments, the MT-MKT 154 can be logically de-coupled from the identity services 132, but have links/associations with corresponding entities in the identity services 132.

The onboarding process can include accessing identity services to determine at least a portion of the entities that are being managed by the respective identity service. If the entities are not being migrated (e.g., by being fully integrated) to the identity services 132, then the identity services can generate representations of the entities being on-boarded in the core hierarchical data structure. These representations are then being used by the IaaS service to determine and use the unified identity (for a certain user) across the multi-tenant platform 102. The representations can include lightweight elements and/or linked elements. The identity services 132 can manage and access the policy configuration 136, such as to enforce access to certain customer and/or merchant domains. The policy configuration 136 can be accessed via the hierarchical data structures (discussed below) for each entity. The process of generating and using user representations is explained in more detail below.

During the onboarding process, a marketplace service 154 can model the actual entities (e.g., the entities 114 such as merchants of the service provider 108 being on-boarded). The modeling includes determining hierarchical organization, such as by jurisdictions (e.g., by countries) and/or organization types (a marketplace organization and a shops organization). For the onboarding process, the marketplace service 154 can facilitate application of certain inbound services onto the entities 114, such as compliance services 140. For example, the marketplace service 154 can facilitate applying of the compliance service 140 to one of the entities 114 via a modeled representation of that entity.

The marketplace service 154 can also determine whether the actual entity being onboarded is already modeled by the multi-tenant platform 102 (e.g., using a cross-tenant identity). For example, the merchant can be modeled as a merchant of the fully integrated provider under the multi-tenant platform 102, as a seller under a different and already onboarded organization type of the service provider 108, and/or a seller of an already onboarded service provider 110, and thus have cross-tenant identities in each of the tenants. The marketplace service 154 can determine whether results of an already performed inbound service for the onboarded merchant can be applied to the merchant being on-boarded.

In some embodiments, the multi-tenant platform 102 can determine whether any outbound services that are configured for the onboarded merchant can be applied to the merchant being on-boarded. For example, an outbound service can include payout transactions that includes transferring (e.g., for completion of a service or purchasing of a good) a certain amount of resources 155 from an account of customers of the multi-tenant platform 102 to an account at a certain financial instrument of the actual merchant of a marketplace of the service provider 108. In some embodiments, the mt-transaction processor 101 can access modeled resources of the service providers 108. The multi-tenant platform 102 then can facilitate access to actual transaction resources that are associated with the modeled resources. The transaction resources can correspond to certain financial instruments which accept transfer of resources open transaction completion (e.g., payout accounts of external financial institutions of the merchant). Upon processing, a value of that transaction resource at one tenant can be changed, such as decremented from one value to another value (and potentially incremented at another value of another transaction resource at another tenant).

The multi-tenant platform 102 can communicate, via the multi-tenant API 126, with the service providers 108-112 and/or the user device 104. The multi-tenant platform 102 can provide, based on a certain unified identity, information related to a tenant, associated services, and/or associated user experiences, to a requesting entity via the multi-tenant tenant API 126. Furthermore, the multi-tenant platform 102 can facilitate communication between various tenants 108-112 (i.e., via their respective representations), such as by providing IaaS services and use of unified identity. For example, a new tenant, such as the service provider 112, can be on-boarded by the multi-tenant platform 102. Information on the new tenant can be stored by one or more of the core services 132-148. In some implementations, upon onboarding, a namespace (e.g., its entities such as merchants and/or customers) that is associated of each tenant can be onboarded onto the identity services 132. In some embodiments, one or more of services of the new tenant, such as the service 124, can be exposed (e.g., as a model) for access to other users of the multi-tenant platform 102. In one embodiment, the core service provider (that is integrated into the multi-tenant platform 102) can process a payment and order fulfillment for products/services offered by the service provider 108 and provided via user experiences accessed at the UI 106.

In one embodiment, the multi-tenant platform 102 can also generate a representation 130(5) of the service 124 at the multi-tenant platform 102. Thus, any access from other tenants, such as from the user device 104 or from the service provider 110), to the service 124 is performed via a unified identity (e.g., by using IaaS) at the service representation 130(5). In some embodiments, for onboarded tenants that are fully integrated, access to services of that tenant can be performed by the mt-transaction processor 101 directly, without using representations of the fully integrated service. In some embodiments, for onboarded tenants that are not fully integrated, access to services of that tenant can be performed by the mt-transaction processor 101 by calling the representation 130(5) of the onboarded (but not fully integrated) service. The representation 130(5) can then access the actual service 124.

The user device 104 can be any type of a computing device that can communicate user requests to the multi-tenant platform 102. The user device 104 can be implemented as a kiosk, a point-of-sale (PoS) terminal, a mobile device, among others. The user device 104 includes a user interface (UI) 106 through which the user can interact with displayed user experiences, such as to access certain services provided via the multi-tenant platform 102. The user device 104 can generate and communicate a user request for a certain service at the multi-tenant platform 102. The user device 104 can interface with the service provider 108-112 and/or with the processing system 100. The transaction processor then can communicate with various components of the multi-tenant platform 102, such as via the multi-tenant API 126.

The multi-tenant platform 102 can provide CaaS, via the compliance service 140, to ensure compliance of the merchants of the service provider 108. The multi-tenant platform 102 can provide risk analysis (e.g., via the Risk core service 138) to determine whether to perform services and/or process payouts for product/services offered by merchants of the service provider 108. The core service provider can perform risk and/or verification services for the new tenant 112 being on-boarded by the multi-tenant platform 102. The core service provider can process payouts from the user account that is associated with the user device 104. The core service provider can provide the payout services to accounts at organizations that are associated with each of the merchants in the context of the associated hierarchy.

Once on-boarded as a core tenant, the accounts of the core service provider can be stored and accessed directly at the multi-tenant platform at the accounts 142 element. For example, a buyer (e.g., a user of the user device 104) can be associated with one payment account, and the seller (e.g., one of the tenants) can be associated with another payment account at the payment system (which can be implemented using the processing system 100). Upon successfully performing the risk analysis on the requested service (e.g., a payout transaction), the core service provider can then perform (e.g., via the payment core service 148) a fund transfer from the buyer's payment account to the merchant's payment account.

The payment system can be implemented by PAYPAL or another online payment system that allows users to send, accept, and request fund transfers. In some embodiments, the user experience can also provide access to certain services. Thus, in addition, or instead of, a payment service, the user experience can include other functionality that is unique for the certain tenant, such as selection of items for order, access to certain SaaS functionality, among others. Thus, the solution provider can provide funds in/funds out (FIFO) services, as determined based on the location data, from the payment system to the users of the user devices. Depending on the context, the FIFO services can move transaction resources between different accounts. During transaction time, the transaction resources can be moved between consumer and merchant accounts. During payout transactions, the transaction resources can be moved between a Merchant's account at the multi-tenant platform 102 to a merchant's external account.

For simplicity, FIG. 1 only shows a single user device 104. However, as discussed herein, the multi-tenant platform 102 interfaces with multiple user devices, and thus provides access to services to many different users. Similarly, the multi-tenant platform 102 can onboard multiple tenants in addition to the ones shown. The multi-tenant platform 102 can also have multiple core tenants that are incorporated as part of the core services 132-148.

Figure 2:
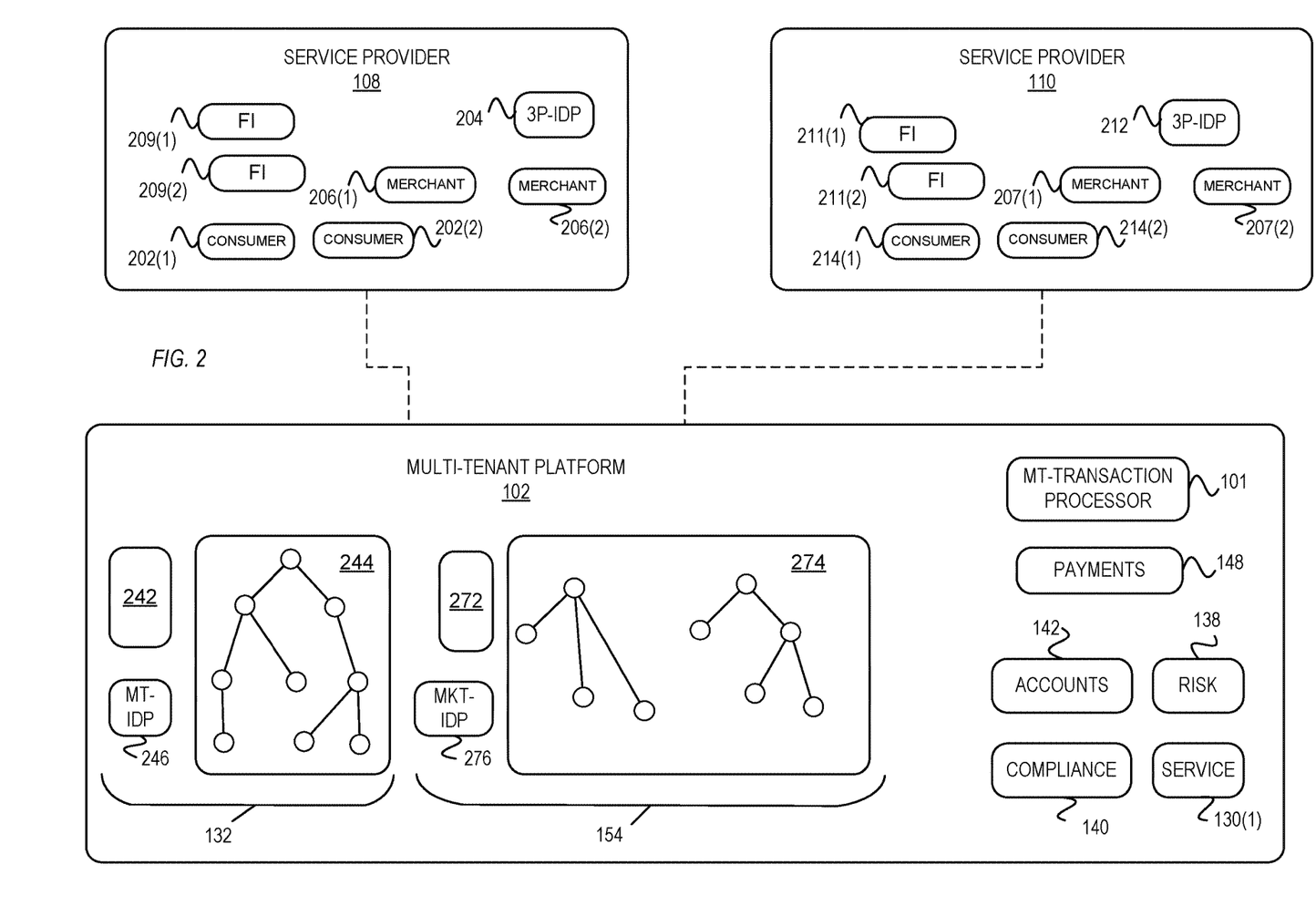
FIG. 2 is a system diagram illustrating embodiments of the multi-tenant marketplace software architecture of FIG. 1.

FIG. 2 is a system diagram illustrating embodiments of the multi-tenant software architecture of FIG. 1 including unified transaction services. FIG. 2 shows embodiments of how the identity services of certain organizations of the service providers 108 and 110, respectively, are modeled by the multi-tenant platform 102. As shown, a marketplace organization of the (actual) service provider 108 can include a third-party identity provider (3P-IDP) 204 that manages entities of merchant 206(1) and 206(2), and entities of consumer 202(1) and 202(2). Similarly, the (actual) service provider representation 110 can include a 3P-IDP 204 that manages entities of consumer 214(1) and 214(2). In some examples, prior to being on-boarded, the service provider 108 is operable to can perform services 116 (optionally based on the policies 123) for the entities 114 using the resources 162, without using the multi-tenant platform 102.

FIG. 2 shows that the multi-tenant platform 102 includes the identity service 132, the accounts 142 element, the risk 138 element, the compliance element 140, as well as services 130(1). It is noted that the multi-tenant platform 102 as shown in FIG. 2 can include all of the services of FIG. 1, some of which are not shown in FIG. 2 for simplicity. The service provider 108 can be modeled by the identity service 132 as part of the hierarchical data structure 244. As discussed below, the identity service 132 can model some parts of the service provider 108, including the 3P-IDP 204 that indicates the merchants 206(1) and 206(2), the consumers 202(1) and 202(2), and/or the FIs 209(1) and 209(2). Each of the FIs 209(1) and 209(2) can be associated with a respective merchant 206(1) and 206(2), such as to accept payout services. For example, the FI 209(1) can be associated with the merchant 206(1), and it can indicate the merchant's external account. The FI 209(1) can be modeled by the multi-tenant platform 102.

It is noted that although the current disclosure discusses using identity managers (e.g., identity services) that use hierarchical data structures to manage and facilitate operations on various entity representations, other implementations are contemplated, including tables, linked lists, and/or graphs, among others. Thus, the term hierarchical data structures encompasses various implementations, and is not meant to be limiting.

The identity service 132 can similarly model some parts of the service provider 110 and/or other service providers. The identity service 132 can model each of the service providers 108 and/or 110 as service provider representations that can be generated during onboarding of the respective service providers 108 and/or 110. The 3P-IDPs 204 and 212 can represent, in the hierarchical data structure 244, the actual IDPs provided by the service providers 108 and 110, respectively.

The identity service 132 includes an access tier 242 and the hierarchical data structure 244 that is managed by an MT-IDP 246. The multi-tenant platform 102 also includes services 138, 142, and 130(1)-130(2). The access tier 242 is a part of the identity service 132 that customizes data associated with the service provider when being on-boarded with the multi-tenant platform 102. For example, the access tier 242 includes information about the products and/or services being offered by the service provider 108, as well as service endpoints for accessing services (e.g., the service 116) offered by the service provider 108. The service endpoints can be referenced by a corresponding node in the hierarchical data structure 244 that represents the service provider 108.

Various embodiments of how the hierarchical data structure 244 is generated and accessed are discussed below with reference to FIGS. 3 and 4. The MT-IDP 246 can generate and manage representations of the entities of the onboarded tenants, i.e., entities 206(1), 206(2), 202(1), and 202(2), as well as the 3P-IDP 204 of the service provider 108. Similarly, the MT-IDP 246 can generate and manage representations of entities 214(1), 214(2), 212 of the service provider 110.

Since each of the service providers 108 and 110 includes own 3P-IDP 204 and 212 respectively, each of these tenants can continue to manage the identities of their own respective entities. For example, the service provider 110 can continue to manage the entities 214(1)-214(2), including managing identity information, contact data, and any characteristics of the consumers 214(1) and 214(2). The service provider 110 can update any changes to the entities 214(1) and 214(2) to the multi-tenant platform 102, such as via a representation of the 3P-IDP 204 in the hierarchical data structure 244. These 3P-IDP 212 originated updates are used to keep the data of their respective representations up-to-date. Similarly, any services (such as core services) performed via the representations of the hierarchical data structure 244 can be propagated back to the 3P-IDP 212.

The identity services 132 allow users to be onboarded as entities onto any of representations of the service providers 108-112. As the service provider itself is a tenant in the multi-tenant architecture 102, a representation of the user would be created by the identity services 132 (such as under a 3P-IDP representation for that tenant representation in the hierarchical data structure 244). That 3P-IDP can be indicated as a system-of-record (SOR) for that onboarded user. The multi-tenant platform 102 can use the identity services 132 to identify the same user and his/her transaction resources across various namespace, thus enabling the same user to have multiple accounts in different namespaces (i.e., referred to as having a cross-tenant identity) and potentially linking or federating these accounts.

The MT-MKT 154 (referred to also as marketplace services 154) can include a resource access tier 272 and a hierarchical data structure 274 that is managed by an MKT-IDP 276. The resource access tier 272 can customize resource data associated with entities (e.g., merchants and sellers) of the service provider when being on-boarded with the multi-tenant platform 102. The resource access tier 272 includes information about the resources 162 that are associated with each one of the entities of the respective service provider, such as resources associated with the merchant 206(1) and/or 206(2). The resource access tier 272 can also include information about transaction services being offered by the service provider 108, as well as service endpoints for accessing the transaction services that use the resources 162. The service endpoints can be referenced by a corresponding node (e.g., a corresponding merchant node) in the hierarchical data structure 244. In some embodiments, the resources can be implemented as funding instruments for payout functionality for the onboarded merchants (e.g., for the merchants 206(1) and 206(2)).

In some implementations, the multi-tenant platform 102 can enable co-ordination of multiple identity namespaces (e.g., separate namespaces associated with the service provider 108, the service provider 110, as well another namespace associated with the fully integrated service provider of the multi-tenant platform 102) to efficiently and securely transfer transaction resources between identities corresponding to entities of these namespaces. For example, a user in one domain (e.g., a namespace associated with the service provider 108) can, via the multi-tenant platform 102, lookup users in other namespaces (e.g., a user in a namespace associated with the service provider 110, or a merchant associated with the service provider 112) and establish a relationship including transaction resource transfers. The multi-tenant platform 102 can use separate identity and marketplace domains, among others, for separate transaction types.

The MKT-IDP 276 can onboard the merchant 206(2) onto the multi-tenant platform 102, such as when the merchant 206(2) is added as a new seller for a marketplace organization of the actual service provider 108. The service provider 108 can already be onboarded as an organization onto the multi-tenant platform 102, including via the identity services 132 onto the hierarchical data structure 244. Various organizations of the service provider 108 can be onboarded via the marketplace services 154 onto the hierarchical data structure 154. The MKT-IDP 276 can determine that the new merchant 206(2) is represented as a representation in subset of a hierarchical data structure 274 for marketplaces of the service provider 108, while the previously onboarded merchant 206(1) is represented as representation in another subset of the hierarchical data structure 274 for online store/shops of the service provider 108.

In some instances, the MKT-IDP 276 can determine that the new merchant 206(2) is substantially the same merchant as the previously onboarded merchant 206(1). In some instances, the MKT-IDP 276 can determine that the new merchant 206(2) is substantially the same as a merchant that has been onboarded onto the core account services 142 of the multi-tenant platform. In yet additional instances, the MKT-IDP 276 can determine that the new merchant 206(2) is substantially the same as a merchant that has been onboarded as a seller of another service provider 110. The MKT-IDP 276 can then link the two first representations (i.e., to indicate a cross-tenant identity) in the hierarchical data structure 274 that correspond to substantially the same merchant. The linking of the merchant representations facilitates propagating results of an inbound service applied to one of the representations (e.g., the representation for the onboarded merchant 206(1) to the other representation (e.g., the representation for the new merchant 206(2). The inbound service can include compliance checks that are required for all merchants, as well as any risk services for the merchants.

The MKT-IDP 276 can determine which of inbound and/or outbound services for the linked merchants can be shared. The MKT-IDP 276 can determine that some transactions, such as resource transactions (e.g., involving purchasing of products/services) from the actual merchants are not shared between the linked representations. Thus, the representation for the merchant 206(1) in the instore/shop can be associated with own transactions. Results of any compliance and/or risk analysis may be shared among the representations. Outbound services include payouts to merchants/sellers via the respective representations, and typically are not shared among representations as each actual merchant may interface with separate payout instruments and separate clients.

Figure 3:
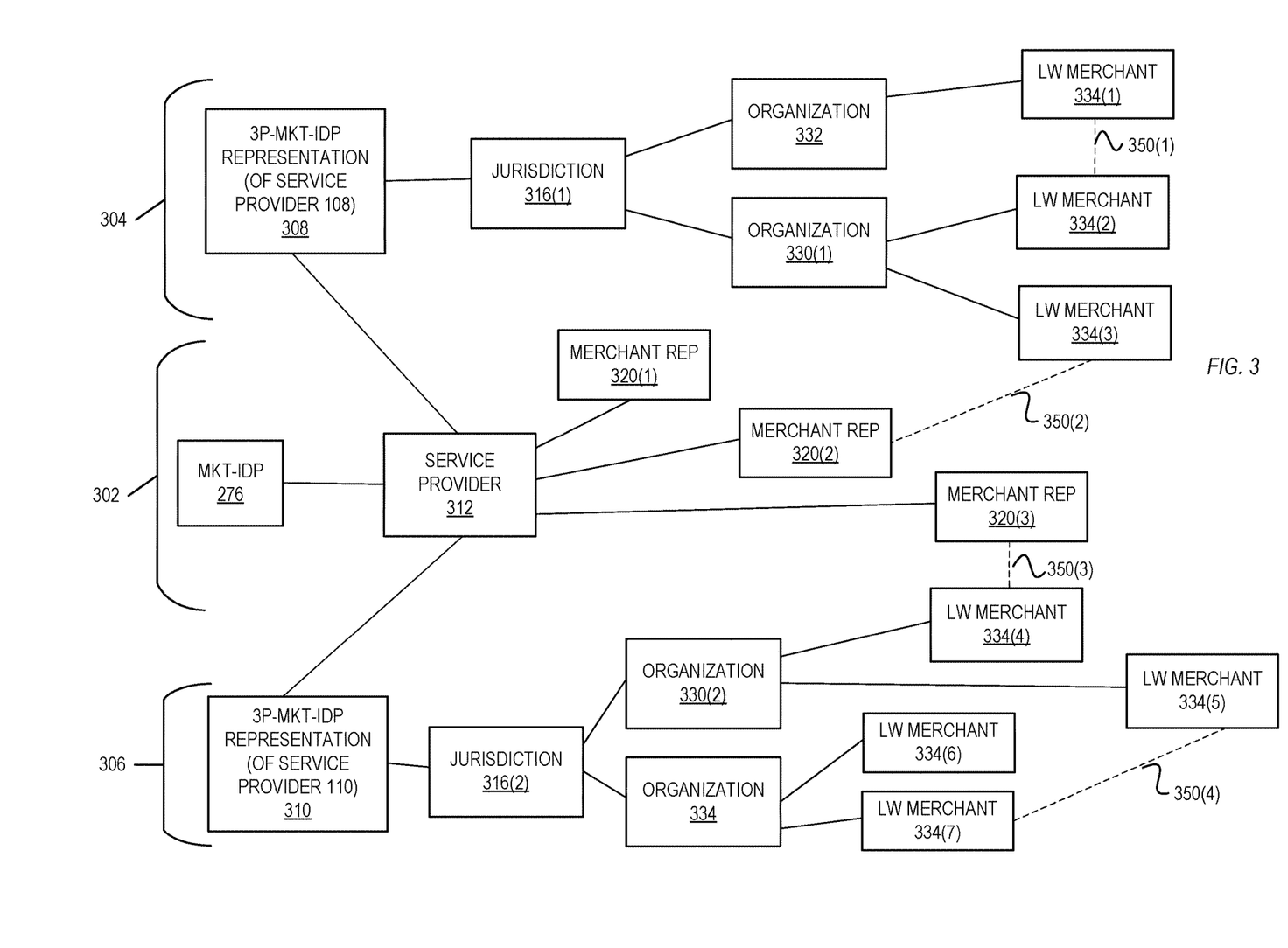
FIG. 3 is a diagram illustrating data structures used by the multi-tenant marketplace architecture systems.

FIG. 3 is a diagram illustrating hierarchical data structures used by the multi-tenant marketplace architecture systems. FIG. 3 illustrates several hierarchical data structures 302, 303, and 304 (which collectively can be referred to as the hierarchical data structure 274), which are accessible via the MKT-IDP 276. FIG. 3 illustrates the relationships between the entities of the hierarchical data structures 302-306. The organization and linking of the hierarchical data structures of FIG. 3 can be referred to as a dependency graph. It is noted that the organization and type of the hierarchical data structures 302-306 is shown for illustrative purposes only, and that one or more of 3P-IDP representations 308 and 310 can be implemented using different data structures, as desired.

The first hierarchical data structure 302 illustrates service provider 312 that is fully integrated. It is noted that via the identity services 132, the fully integrated service provider can offer core services to various users of the multi-tenant architecture. As shown, the service provider 312 includes merchant representations 320(1)-320(3), which can include complete information on the actual merchant. The fully integrated merchant representations 320(1)-320(3) can be operated on directly by the multi-tenant platform 102.

The hierarchical data structure 304 can correspond to various entities of the on-boarded service provider 108, and is able to model complex relationships between the sellers, merchants, and various organizational entities of the service provider 108 (such as GOOGLE). For example, the 3P-MKT-IDP 308 can correspond to GOOGLE, the organization 332 can correspond to YOUTUBE, and the organization 330(1) can correspond to a GOGGLE marketplace application. The hierarchical data structure 304 is managed by the 3P-MKT-IDP representation 308. Thus, the 3P-MKT-IDP representation 308 can be a representation, in the hierarchical data structure 274, of a portion of the 3P-IDP 204 that corresponds to the various sellers and merchants of the various organizations of the service provider 108. The Identity-as-a-Service (IaaS) services can be used by the MKT-IDP 276 to properly create the relationships between the merchants being onboarded. As shown the 3P-MKT-IDP 308 can itself be associated with the service provider 312.

The hierarchical data structure 304 can include various entities, including a jurisdiction 316(1) and organization 332 and 330(1). The hierarchical data structure 304 includes lightweight merchants LW 334(1)-334(3). The jurisdiction entity 316(1) indicates a certain jurisdiction, such as the USA or the EU. Each jurisdictional entity can have a different set of requirements indicating how transactions on their entities (e.g., the lightweight merchants 334(1)-334(3)) can be performed. Each jurisdictional entity can also indicate a separate set of compliance requirements. The organization entity can indicate an organization type, such as a marketplace organization, an instore/shop organization, among others. A lightweight merchant is an entity that represents a corresponding entity in another hierarchical data structure, and that contains some of the data for that corresponding entity.

The hierarchical data structure 304 includes LW merchant 334(1) in an organization 332 (which can be a certain business unit of the service provider 108) that is linked (i.e., using a link 350(1)) in an organization 330(1) (which can be a marketplace of service provider 108). The link 350(1) can indicate that selected inbound services performed on one of the LW merchants 334(1) and 334(2) can be propagated onto the other linked LW merchant. Thus, the link 350(1), which can be generated as discussed herein (e.g., with reference to FIG. 5), is between two lightweight merchants that are onboarded for the same service provider 108.

The hierarchical data structure 304 includes a LW merchant 334(3) in the organization 330(1) that is linked, using a link 350(2)) with a merchant representation 320(2). The link 350(2) can indicate that selected inbound services performed on the merchant representation 320(2) can be propagated onto the linked LW merchant 334(3). Thus, the link 350(2) is between a full representation of the merchant at 320(3) and its lightweight merchant representation at 334(3).

Similarly, the hierarchical data structure 306 can correspond to various entities of the on-boarded service provider 110, and is able to model complex relationships between the sellers, merchants, and various organizational entities of the service provider 110 (such as FACEBOOK). The hierarchical data structure 306 is managed by the 3P-MKT-IDP representation 310. Thus, the 3P-MKT-IDP representation 310 can be a representation, in the hierarchical data structure 274, of a portion of the 3P-IDP 212 that corresponds to the various sellers and merchants of the various organizations of the service provider 110.

The hierarchical data structure 306 can include various entities, including a jurisdiction 316(2) and organizations 334 and 330(2). The hierarchical data structure 306 also includes lightweight merchants LW 334(4)-334(7). The jurisdiction entity 316(2) also can indicate a jurisdiction. The hierarchical data structure 306 includes LW merchant 334(4) and 334(5) in an organization 330(2) (which can be a marketplace of the service provider 110). The LW merchant 334(4) can be linked using a link 350(3) to the merchant representation 320(3). Thus, the link 350(3) is between a full representation of the merchant at 320(3) and its lightweight merchant representation at 334(4). The hierarchical data structure 306 also includes LW merchants 334(6) and 334(7) in the organization 334 (which can correspond to an online/shop organization). The LW merchants 334(5) and 334(7) can be linked using a link 350(4), thus linking two lightweight merchant representations of the same service provider 110, but under different organizations.

During the process of onboarding the service providers 108 and 110, the multi-tenant platform 102 can generate the hierarchical data structures for identity and for sharing inbound/outbound services (referred to herein as marketplace services). As shown in FIG. 3, the multi-tenant platform 102 can generate the lightweight representations for that service provider's merchants and sellers. In some embodiments, the identity services generate separate identity hierarchical data structures where integrated identities of the merchants, their customers, and various transaction services are managed. Although the actual identities of the merchants are managed by that tenant's 3P-IDP, transactions are provided to the service provider and their merchants via the marketplace services.

Figure 4:
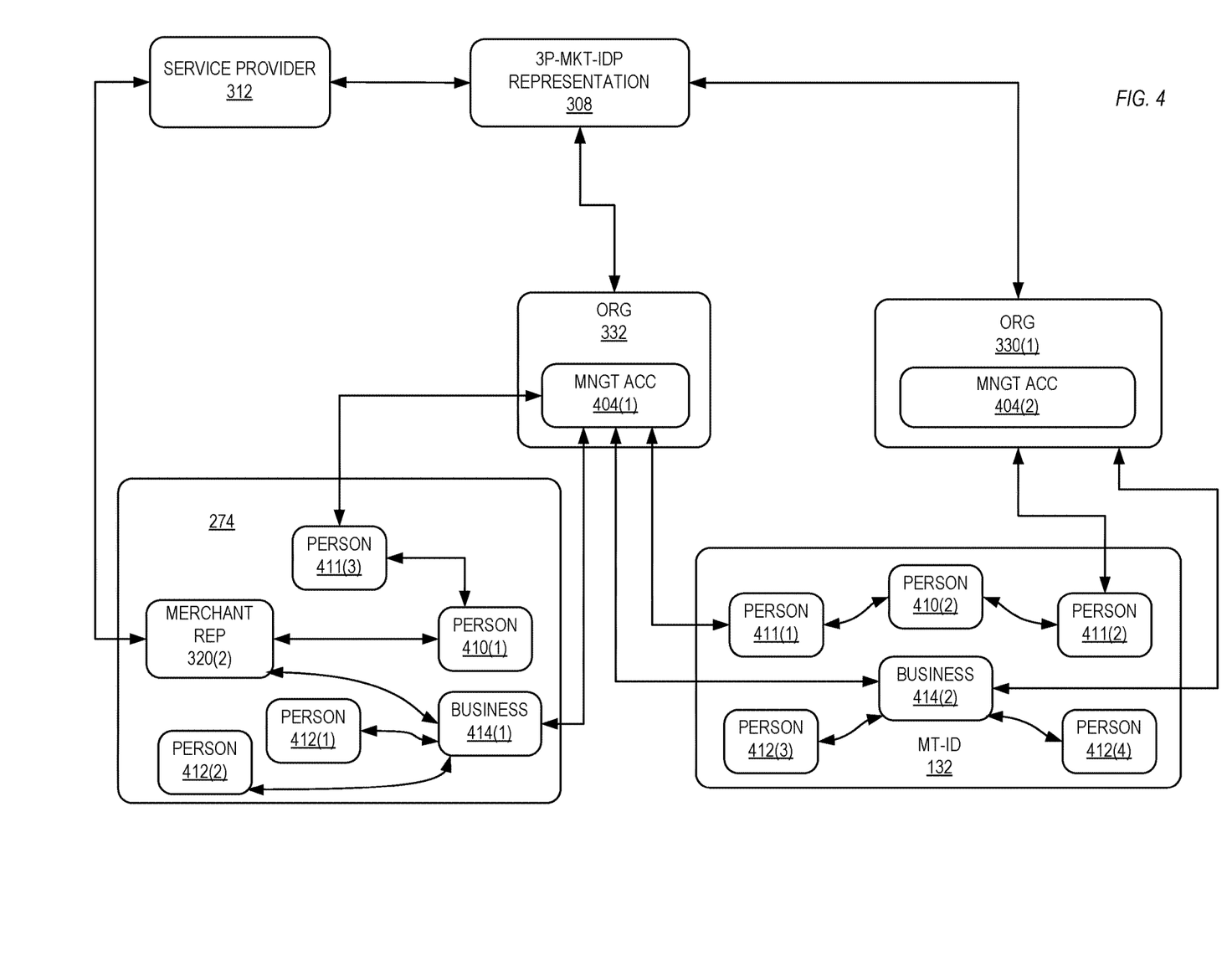
FIG. 4 is a diagram illustrating embodiments of relationships between various entities being used to indicate inbound services between entity representations of a common entity.

FIG. 4 is a diagram illustrating embodiments of relationships between various entities being used to indicate inbound services between entity representations of a common entity. FIG. 4 illustrates data structure (such as can be hosted by the resource access tier 272) used by the MKT-IDP 276 to manage relationships (of the hierarchical data structure 274) between various merchant and seller entities. FIG. 4 is described with reference to the examples shown in FIGS. 1-3 for ease of explanation.

In some embodiments, the link 350(1) can be implemented using one or more of the entities 308, 332, 334(1), 330(1), 334(2), 410(2), 414(2), 411(1), 411(2), and 412(3) and 414(4). As discussed above with reference to FIG. 3, the 3P-MKT-Representation 308 can be associated with the organizations 332 and 330(1). The entities 334(1) and 334(2) are optional, and indicate accounts that are indicated with the organizations 332 and 330(1). Each of the organizations 332 and 330(1) can be associated (e.g., via their respective managed accounts 404(1) and 404(2)) with a person entity 411(1) and 411(2), respectively. Each of the person entity 411(1) and 411(2) is a copy of the person 410(2) which can indicate the primary account user for that managed account. The person 410(2) can indicate the entity for which certain compliance checks are performed. It is noted that in some implementations the person entities 411(1) and 411(2) are not used, and the organizations 332 and 330(1) are associated directly with the person 410(2), while optionally separating any transactions between the different organizations.

Each of the organizations 332 and 330(1) can be associated (e.g., via their respective managed accounts 404(1) and 404(2)) with a business entity 414(2). The business entity 414(2) can indicate the underlying actual business that is being represented. The persons 412(3) and 414(4) can indicate any stakeholder entities of the actual business, and are included for compliance requirements.

In some embodiments, the link 350(2) can be implemented using one or more of the entities 308, 312, 411(3), 332, 334(1), 320(2), 410(1), 414(1), and 412(1) and 412(2). As discussed above with reference to FIG. 3, the 3P-MKT-Representation 308 can be associated with the organizations 332, and the entity 334(1) is optional. The organizations 332 can be associated with the person 411(3) which can be a copy of the prime person 410(1). The service provider 312 is associated with the merchant representation 320(2). Both the person 411(3) and the service provider 312 can be associated with the prime person 410(1). Each of the organizations 332 and the merchant representation 320(2) can be associated with a business entity 414(1). The persons 412(1) and 414(2) can indicate any stakeholder entities of the actual business, and are included for compliance requirements.

Figure 5:
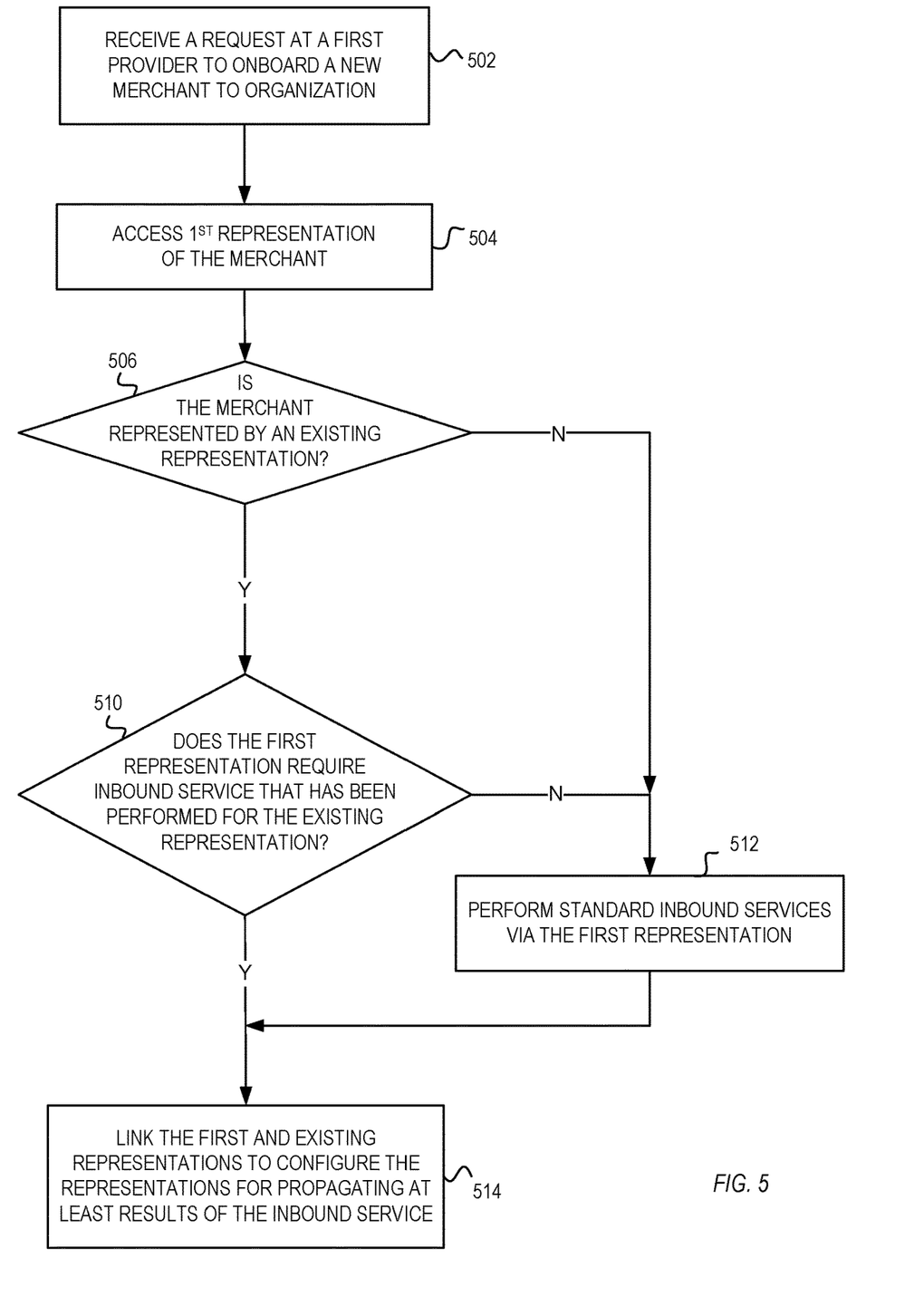
FIG. 5 is a diagram illustrating embodiments of flow of operations of using the multi-tenant marketplace architecture.

FIG. 5 is a flow diagram illustrating embodiments of operations for using multi-tenant software architecture systems that provide unified transaction services. The method of FIG. 5 is described with reference to the systems and components described in FIGS. 1-4 (for illustration purposes and not as a limitation). The example operations can be carried out by the transaction processor that uses the multi-tenant platform 102.

Beginning with 502, the processing system 100 receives a request at a first provider to onboard a new merchant to organization. With reference to FIG. 2, the multi-tenant platform 102 can receive a request to onboard a new merchant 206(2) of the service provider 108. The service provider 108 can be a new tenant, or can be an already onboarded tenant that is adding a new merchant into the marketplace services 154. The request can be generated automatically upon the new merchant 206(2) being used at a marketplace organization (or another organization) via the MT-MKT 154 model of the service provider 108. In some cases, at 502 the MT-MKT 154 can simply receive a request to perform a certain inbound service on the representation of the new merchant 206(2) that has already been on-boarded, e.g., as a periodic inbound compliance service.

At 504, the multi-tenant platform 102 accesses a representation of the merchant. The multi-tenant platform 102 can access the representation (which can be a lightweight merchant representation) that is managed by a first hierarchical data structure (or by another representation of the model of the service provider 108 in the MT-MKT 154). In cases where the service provider 108 is not yet onboarded onto the multi-tenant platform 102, the service provider 108 can be onboarded onto the identity services 132, and also onto the marketplace services 154 where applicable.

At 506, the multi-tenant platform 102 determines whether the new merchant is already represented by an existing representation. If the new merchant is already represented by an existing representation (i.e., if the new merchant has a cross-tenant identity), flow continues to 512. Otherwise, flow continues to 508. With reference to FIGS. 2 and 3, the MKT-IDP 276 can determine whether the new merchant 206(2) is already represented as a merchant as an entity in the hierarchical data structure 274, e.g., in another organization, jurisdiction, and/or tenant. In some cases, the new merchant 206(2) can be modeled as an entity under the identity services 132, but not under the marketplace services 154.

In some instances, the MKT-IDP 276 can determine that there is a link (such as the link 350(1)) that indicates the existing representation in cases where the new merchant 206(2) is already onboarded but needs a service such as compliance service 140. In some instances, the MKT-IDP 276 can determine the existing representation (such as by comparing various merchant characteristics between existing merchant representations and the new merchant), but the link has not yet been created. In some instances, neither the lightweight merchant representation nor the link has been created for the new merchant.

At 510, the multi-tenant platform 102 determines whether the first representation requires an inbound service that has been performed on the existing representation. For example, if an organization of the first representation requires an inbound service that has been performed on the existing representation, flow continues to 514. Otherwise, flow continues to 512. With continued reference to FIGS. 2 and 3, the MKT-IDP 154 can determine whether the existing representation 206(1) indicates that the inbound service (e.g., the compliance service 140) has been performed. In some embodiments, the MKT-IDP 154 can determine whether the performed service can be applied to the new merchant. For example, the organization and/or jurisdiction type of the representation for the new merchant can indicate that only a portion, or none, of the results of the performed compliance can be applied to the new merchant. In some instances, if the merchant representations are managed by different tenants, such as for the new lightweight merchant representation 334(2) and the existing merchant representation 334(6), a link cannot be created and none of the existing compliance service can be used for the new merchant due to a potential conflict between the tenants 108 and 110. In some instances, such potential conflicts can be overcame by explicit approval from each of the conflicting actual tenants and/or their policies.

At 512, the multi-tenant platform 102 performs standard inbound services via the first representation. Thus, the MKT-IDP 154 can apply compliance services 140 onto the new merchant 206(2), such as via the newly onboarded representation of the new merchant 206(2). For existing onboarded merchants, such as the lightweight merchant 334(6) without any existing representations, the MKT-IDP 154 can apply the inbound service on its corresponding merchant.

At 514, the multi-tenant platform 102 links the first and existing representations to configure the representations for propagating at least results of the inbound service. For new merchants that have not yet been onboarded, the MKT-IDP 154 can onboard the new merchant onto the hierarchical data structure 274. For merchants that have been onboarded but not linked with the existing representations, the MKT-IDP 154 can determine the type of link (such as the link 350(1) or the link 350(2)). As discussed above with reference to FIG. 4, the MKT-IDP 154 can access a common account entity corresponding to a shared business between the first and second representations, the common account entity indicating compliance-related characteristics shared between the first and second representations. The MKT-IDP 154 can update the common account entity to indicate a merchant representation link between the first and second representations.

It should be understood that FIGS. 1-5 and the operations described herein are examples meant to aid in understanding embodiments and should not be used to limit embodiments or limit scope of the claims. Embodiments may perform additional operations, fewer operations, operations in a different order, operations in parallel, and some operations differently. For example, one or more elements, steps, or processes described with reference to the flow diagrams of FIG. 5 may be omitted, described in a different sequence, or combined as desired or appropriate.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible and/or non-transitory medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The computer program code may execute (e.g., as compiled into computer program instructions) entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flow diagram illustrations and/or block diagrams of methods, apparatus (systems) and computer program products according to embodiments of the present disclosure. It will be understood that each block of the flow diagram illustrations and/or block diagrams, and combinations of blocks in the flow diagram illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flow diagrams and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flow diagrams and/or block diagram block or blocks.

Figure 6:
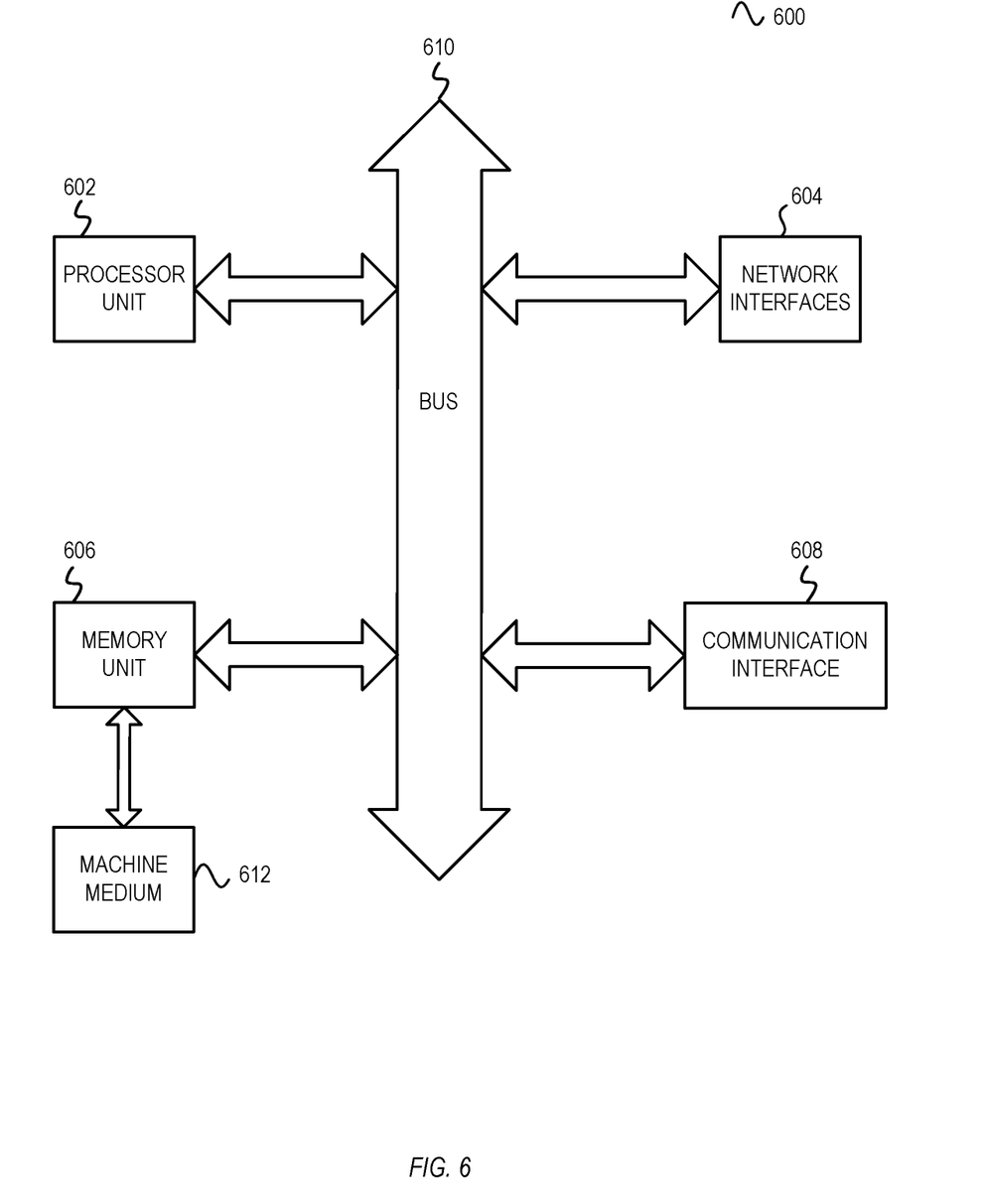
FIG. 6 is a block diagram illustrating embodiments of electronic devices used in the communication systems of FIGS. 1-5.

FIG. 6 is a block diagram of one embodiment of an electronic device 600 used in the communication systems of FIGS. 1-5. In some implementations, the electronic device 600 may be a laptop computer, a tablet computer, a mobile phone, a kiosk, a powerline communication device, a smart appliance (PDA), a server, and/or one or more other electronic systems. For example, a user device may be implemented using a mobile device, such as a mobile phone or a tablet computer. For example, a payment system may be implemented using one or more servers. The electronic device 600 can include a processor unit 602 (possibly including multiple processors, multiple cores, multiple nodes, and/or implementing multi-threading, etc.). The electronic device 600 can also include memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 can also include a bus 610 (e.g., PCI, ISA, PCI-Express, HyperTransport®, InfiniBand®, NuBus, AHB, AXI, etc.), and network interfaces 604 can include wire-based interfaces (e.g., an Ethernet interface, a powerline communication interface, etc.). The electronic device 600 includes a communication interface 608 for network communications. The communication interface 608 can include at least one of a wireless network interface (e.g., a WLAN interface, a Bluetooth interface, a WiMAX interface, a ZigBee interface, a Wireless USB interface, etc.). In some implementations, the electronic device 600 may support multiple network interfaces—each of which is configured to couple the electronic device 600 to a different communication network.

The memory unit 606 can embody functionality to implement embodiments described in FIGS. 1-6 above. In one embodiment, the memory unit 606 can include one or more of functionalities for using multi-tenant marketplace architecture systems. Any one of these functionalities may be partially (or entirely) implemented in hardware and/or on the processor unit 602. For example, some functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, memory unit 606, the network interfaces 604, and the communication interface 608 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the present disclosure is not limited to them. In general, techniques for using multi-tenant marketplace architecture systems as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present disclosure. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the present disclosure.

What is claimed is:

1. A method for managing entities in a multi-tenant marketplace architecture system, the method comprising:
    accessing a first representation of a first merchant in a first hierarchical data structure, the first hierarchical data structure being managed by a first service provider, the first service provider managing entity identity of the first merchant, the first merchant being managed via a full representation in an original hierarchical data structure by a marketplace service provider;
    determining that the first merchant requires a compliance service prior to providing transaction services to users accessing the first hierarchical data structure;
    determining that the first merchant is further represented by a second representation of the first merchant in the first hierarchical data structure;
    determining whether a previous compliance service performed via the second representation satisfies requirements of the compliance service for the first representation; and
    responsive to a determination that the previous compliance service satisfies the requirements, indicating that the compliance requirements of the first representation are satisfied.

2. The method of claim 1, further comprising:
    linking the first and second representations for providing inbound services to each of the representations while keeping each of outbound services having own separate data structures.

3. The method of claim 1, further comprising:
    determining whether the first merchant comprises a third representation having own internal data structure for providing transaction services to users; and
    providing additional linking between the second and third representations.

4. The method of claim 1, further comprising:
    determining whether the first merchant comprises a third representation of the merchant having own internal data structure for providing transaction services to users;
    determining a difference in compliance requirements based on a difference in regulations between the second and third representations; and
    initiating a subset of compliance requirements corresponding to the difference in compliance requirements on the first merchant via the second representation.

5. The method of claim 1, wherein said determining whether the previous compliance service satisfies requirements of the compliance service for the first representation comprises:
    accessing, in the first hierarchical data structure, a common account entity corresponding to a shared business between the first and second representations, the common account entity indicating compliance-related characteristics shared between the first and second representations; and
    updating the common account entity to indicate a merchant representation link between the first and second representations.

6. The method of claim 1, further comprising:
    linking the first representation with the second representation to configure the first and second representations for propagating results of an inbound service applied to one of the first and second representations to a remaining one of the first and second representations.

7. The method of claim 1, further comprising:
    determining additional services that can be shared between the first representation and the second representation.

8. The method of claim 1, further comprising:
    generating, independent of the second representation, a resource request for providing a first amount of transaction resources for a first transaction service to a resource of the first merchant via the first representation.

9. The method of claim 1, wherein
    the first hierarchical data structure comprises a first marketplace representation and a second marketplace representation corresponding to a first marketplace entity and a second marketplace entity, respectively;
    the first hierarchical data structure indicates that the first marketplace entity and the second marketplace entity share the first merchant; and
    the first hierarchical data structure indicates that transactions for the first merchant are processed independently of each other for each of the marketplaces.

10. A system comprising:
    a non-transitory memory storing instructions; and
    a processor configured to execute the instructions to cause the system to:
    determine that a merchant is represented as a first representation in a first hierarchical data structure and as a second representation in a second hierarchical data structure, both the first and second hierarchical data structures managed by a first service provider, the merchant being managed via a full representation in an original hierarchical data structure by a marketplace service provider, the first and second representations providing outbound services via the first hierarchical data structure and via the second hierarchical data structure, respectively; and
    link the first representation with the second representation to configure the first and second representations for propagating results of an inbound service applied to one of the first and second representations to a remaining one of the first and second representations.

11. The system of claim 10, wherein the results of an inbound service comprise compliance results of a compliance service performed on the merchant via the first representation; and said propagating the results comprise applying the compliance results via the first representation to the second representation.

12. The system of claim 10, wherein executing the instructions further cause the system to, responsive to said linking, finalize onboarding of the second representation onto the second hierarchical data structure to expose services provided by a third service provider to a linked identity reference from the second service provider.

13. The system of claim 10, wherein executing the instructions further cause the system to, generate a resource request for consuming a first amount of transaction resources, via resource representation, for first transaction service.

14. The system of claim 10, wherein the first and second representations are configured to provide outbound services independently of each other.

15. The system of claim 10, wherein executing the instructions further cause the system to, determine whether the inbound service comprises a compliance service that was applied to the merchant via the first representation;

determine whether the compliance service satisfies requirements for the first representation by accessing, in the first hierarchical data structure, a common account entity corresponding to a shared business between the first and second representations, the common account entity indicating compliance-related characteristics shared between the first and second representations; and update the common account entity to indicate the link between the first and second representations.

16. A non-transitory machine-readable medium having instructions stored thereon, the instructions executable to cause performance of operations comprising:

determining that a merchant is represented as a first representation in a first hierarchical data structure and as a second representation in a second hierarchical data structure, both the first and second hierarchical data structures managed by a first service provider, the merchant being managed via a full representation in an original hierarchical data structure by a marketplace service provider, the first and second representations providing outbound services via the first hierarchical data structure and via the second hierarchical data structure, respectively;

linking the first representation with the second representation to configure the first and second representations for propagating results of an inbound service applied to one of the first and second representations to a remaining one of the first and second representations.

17. The non-transitory machine-readable medium of claim 16, wherein the results of an inbound service comprise compliance results of a compliance service performed on the merchant via the first representation; and said propagating the results comprise applying the compliance results via the first representation to the second representation.

18. The non-transitory machine-readable medium of claim 16, wherein the operations further comprise:

responsive to said linking, finalizing onboarding of the second representation onto the second hierarchical data structure to expose services provided by a third service provider to a linked identity reference from the second service provider.

19. The non-transitory machine-readable medium of claim 16, wherein the operations further comprise:

generate a resource request for consuming a first amount of transaction resources, via the resource representation, for the first transaction service.

20. The non-transitory machine-readable medium of claim 16, wherein the operations further comprise:

determining whether the inbound service comprises a compliance service that was applied to the merchant via the first representation;

determining whether the compliance service satisfies requirements for the first representation by accessing, in the first hierarchical data structure, a common account entity corresponding to a shared business between the first and second representations, the common account entity indicating compliance-related characteristics shared between the first and second representations; and update the common account entity to indicate the link between the first and second representations.

* * * * *